UNITED STATES PATENT OFFICE.

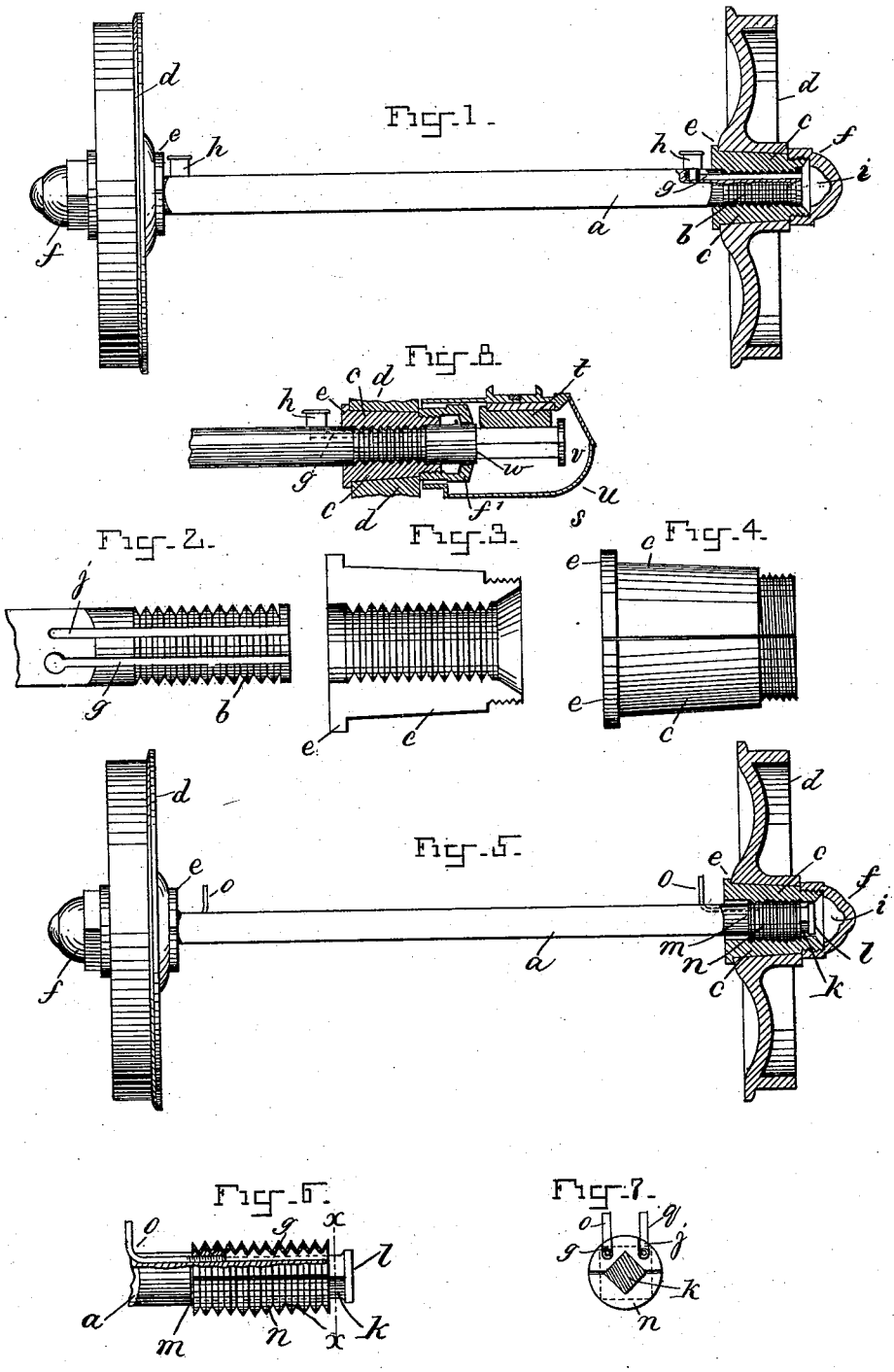

GIBSON W. FAIRMAN, OF NEW YORK, N. Y.

CAR WHEEL AND AXLE.

SPECIFICATION forming part of Letters Patent No. 507,265, dated October 24, 1893.

Application filed February 13, 1893. Serial No. 462,223. (No model.)

*To all whom it may concern:*

Be it known that I, GIBSON W. FAIRMAN, a citizen of the United States, and a resident of New York city, in the county and State of New York, have invented certain new and useful Improvements in Car Wheels and Axles, of which the following is a specification.

My invention relates to improvements in car wheels and axles consisting essentially of a car wheel bearing formed of tapering semi-annular bushing pieces fitted tightly into the hub of the wheel and having their concave journal bearing surfaces grooved to fit corresponding V shaped circumferential grooves and ridges on the periphery of the axle journals whereon a patent was granted to me November 14, 1882, No. 267,508, and it consists in improvements in the construction whereby the wheels or axle may have lateral play to a limited extent which is necessary to the proper working of the car, and it also consists of improvements in the means for lubricating the bearings, all as hereinafter fully described reference being made to the accompanying drawings in which—

Figure 1, is a front elevation of an axle and pair of wheels, with one of the wheels and part of the axle in section showing my present improvement in the means of lubricating the wearing parts constructed as in my former patent referred to. Fig. 2, is a plan view of one end portion of the axle as in Fig. 1. Fig. 3, is a plan view of one of the semi-annular bushings. Fig. 4, is a side view of the two semi-annular bushings, placed together as in the wheel and when applied to the axle. Fig. 5, is a front elevation of an axle and pair of wheels with one of the wheels and bushings in section showing the improvement in the construction for lateral play. Fig. 6, is a side view of part of the apparatus of Fig. 5, for lateral play, with some parts in section. Fig. 7, is a transverse section of Fig. 6, on line *x x*. Fig. 8, is a side view of part of an axle of common form and section of the wheel and bushings, and the ordinary axle box, showing the application of my invention thereto for lateral play, and for lubrication.

In Figs. 1, 2, 3 and 4, I represent the same construction as in my former patent except as to the means of lubricating the wearing parts, the said construction consisting of V grooves formed on the axle *a*, at *b*, with sectional bushings *c*, preferably in two semi-circular parts, correspondingly grooved internally to fit the grooved part of the axle, and tapered externally to fit tightly in the wheel *d*, with a collar *e*, at the larger end and a cap nut *f*, to screw on the small end for securing the wheel, the grooved bushings being a means to enable the wheels to be applied in a practically efficient way whereby the two wheels may work independently of each other, the bushings being fitted tightly in the wheel and rotating with it on the grooved section of the axle, the said ribs and grooves being an effectual means of confining the wheels on the axle. In this form of the invention the car body is to be mounted on the axle inside of the wheels, the axle being confined so as not to rotate, and an oil groove *g*, is made from inside of the wheel where an oil cup *h*, or an oil feeding pipe from a cup located elsewhere, may be attached for feeding the oil along through the grooved part of the axle to the chamber *i*, of the cap nut which is intended for a reservoir to be filled from time to time for lubricating the wearing parts automatically.

In the practical use of the invention thus constructed it has been found that the air in the reservoir prevents the oil from flowing in readily for lack of any way of escape, the intermeshing ribs and grooves forming, especially after having become lubricated, an effective obstacle to the escape of the air in the reservoir as is necessary to permit the oil to flow in. I have therefore now provided a vent groove *j*, along the upper side of the grooved section of the axle parallel with the filling groove, and extending a suitable distance beyond the inner end of the bushing to have free opening to the atmosphere, and thus provide for unobstructed flow of the oil into the reservoir, which cannot be vented through the cap because it rotates with the wheel and the oil would escape. The oil and vent grooves being in the upper side of the axle, and the lower side sustaining the pressure of the load, cutting of the bushings by the sharp angles at the edges of the oil grooves is prevented because there is no pressure of the bushings against the threads of the upper side of the axle.

To provide for lateral play of the wheels in this plan of construction for supporting the load between the wheels, I make the axle with a plain part $k$, of angular cross section instead of the ribs and grooves with a collar $l$, at the end and a shoulder $m$, or it may be a collar at a suitable distance from the end, and apply thereto other bushings $n$, having the corresponding plain angular cavities but threaded or grooved on the exterior with the like sectional or semi-circular and internally threaded bushings $c$, applied to them, and similarly fitted in the wheel and secured by the collar $e$, and cap nut $f$, said bushings $n$, being as much shorter than the length of the angular section $k$, as the desired lateral play of the wheel. Thus I utilize the very efficient ribbed and grooved device for coupling the independent wheels on the axle and have the needed lateral play also. I make the same oil inlet and vent grooves $g$, and $j$, in this case also, but connect the oil feeding pipe $o$, directly with the bushing, a part of the oil groove therein being a screw tapped hole as at $p$ for making such connection, because a practicable connection of the oil groove in the bushing can not be had with a groove in the axle; the oil feeding pipe may extend to any convenient position on the car for the location of the oil cup, and a stand pipe $q$, may be connected into the vent groove if desired to obstruct the escape of oil.

To apply the invention to axles of the common form such as support the load outside of the wheel, and so as to provide for lateral play also I make the grooved section $b$, and apply the grooved bushings $c$ same as in Fig. 1, and provide a nut $f'$ for securing the bush in the wheel with a hole through it for the projecting part $s$ of the axle on which the load is mounted by a bearing $t$, in the ordinary axle box $u$, and I make this part $s$ and the part of the bearing resting on it of angular cross section, to prevent the axle from turning to enable it to be lubricated by an oil groove $g$, in the top same as in the arrangement of Fig. 1.

The part $s$ of the axle is, like the part $k$ of Figs. 5 and 6 made longer between the collar $v$, and shoulder $w$, than the bearing $t$, which allows the required lateral play of the wheel relatively to the body. The vent groove $j$ may also be provided in this case if desired, but it is not so essential because the hole through the nut $f'$ will serve for the vent.

Although the bushings $c$, and the hole in the wheel in which they are fitted are represented as taper, they may be cylindrical if preferred, and I propose to make them so when required.

I claim—

1. A car wheel and axle connected by the sectional internally grooved bushings secured in the wheel, and the grooved section on the axle, said wheel having lateral play relatively to the body supported on the axle substantially as described.

2. A car wheel and axle connected by the sectional internally grooved bushings secured in the wheel, and the grooved bushings on the axle, said wheel having lateral play relatively to the body supported on the axle substantially as described.

3. A car wheel and axle connected by the sectional internally grooved bushings secured in the wheel and the grooved bushings on the axle, said bushings on the axle having lateral play thereon substantially as described.

4. A car wheel and axle connected by the sectional internally grooved bushings secured in the wheel and the grooved section on the axle, and having the oil reservoir at the outer end of the wheel hub, with the lubricating and vent grooves in the upper side of said grooved section of the axle, and communicating from the inner end thereof with the oil reservoir substantially as described.

5. A car wheel and axle connected by the sectional internally grooved bushings secured in the wheel and the externally grooved bushings on the axle, and having the oil reservoir at the outer end of the hub, said bushings on the axle having the lubricating and vent grooves in the upper side communicating from their inner end with the oil reservoir, and a feed pipe for the oil connected in the inner end of the oil groove substantially as described.

Signed at New York city, in the county and State of New York, this 31st day of January, A. D. 1893.

GIBSON W. FAIRMAN.

Witnesses:
W. J. MORGAN,
C. E. WHITNEY.